United States Patent
Miller et al.

(10) Patent No.: US 9,746,675 B2
(45) Date of Patent: Aug. 29, 2017

(54) ALIGNMENT BASED VIEW MATRIX TUNING

(71) Applicant: Microsoft Technology Licensing, LLC, Redmond, WA (US)

(72) Inventors: Quentin Simon Charles Miller, Sammamish, WA (US); Drew Steedly, Redmond, WA (US); Denis Demandolx, Bellevue, WA (US); Youding Zhu, Sammamish, WA (US); Qi Kuan Zhou, Bellevue, WA (US); Todd Michael Lyon, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 113 days.

(21) Appl. No.: 14/724,486

(22) Filed: May 28, 2015

(65) Prior Publication Data
US 2016/0349510 A1 Dec. 1, 2016

(51) Int. Cl.
*G02B 27/01* (2006.01)
*G06T 19/00* (2011.01)
(Continued)

(52) U.S. Cl.
CPC ..... *G02B 27/0172* (2013.01); *G02B 27/0179* (2013.01); *G06T 19/006* (2013.01);
(Continued)

(58) Field of Classification Search
None
See application file for complete search history.

(56) References Cited

U.S. PATENT DOCUMENTS

| 5,446,834 A | 8/1995 | Deering |
| 8,581,905 B2 | 11/2013 | Mitchell |

(Continued)

FOREIGN PATENT DOCUMENTS

| EP | 2765776 A1 | 8/2014 |
| JP | 4743818 B2 | 8/2011 |

(Continued)

OTHER PUBLICATIONS

"Oculus VR- SDK API Overview", Published on: Apr. 14, 2014' Available at: http://static.oculusvr.com/sdk-downloads/documents/Oculus_SDK_Overview_0.3.1_Preview.pdf.
(Continued)

*Primary Examiner* — Joseph Haley
*Assistant Examiner* — Emily Frank
(74) *Attorney, Agent, or Firm* — Alleman Hall Creasman & Tuttle LLP

(57) ABSTRACT

A head-mounted display device is disclosed, which includes an at least partially see-through display, a processor configured to detect a physical feature, generate an alignment hologram based on the physical feature, determine a view of the alignment hologram based on a default view matrix for a first eye of a user of the head-mounted display device, display the view of the alignment hologram to the first eye of the user on the at least partially see-through display, output an instruction to the user to enter an adjustment input to visually align the alignment hologram with the physical feature, determine a calibrated view matrix based on the default view matrix and the adjustment input, and adjust a view matrix setting of the head-mounted display device based on the calibrated view matrix.

18 Claims, 9 Drawing Sheets

(51) Int. Cl.
H04N 13/00 (2006.01)
H04N 13/04 (2006.01)
(52) U.S. Cl.
CPC ....... *H04N 13/0022* (2013.01); *H04N 13/044* (2013.01); *H04N 13/0497* (2013.01); *G02B 2027/014* (2013.01); *G02B 2027/0118* (2013.01); *G02B 2027/0138* (2013.01); *G02B 2027/0174* (2013.01); *G02B 2027/0178* (2013.01)

(56) References Cited

U.S. PATENT DOCUMENTS

| | | | |
|---|---|---|---|
| 8,786,675 | B2 | 7/2014 | Deering |
| 2010/0097671 | A1 | 4/2010 | Leister |
| 2011/0304647 | A1 | 12/2011 | Noge |
| 2012/0068913 | A1* | 3/2012 | Bar-Zeev ............ G02B 26/026 345/8 |
| 2013/0050642 | A1 | 2/2013 | Lewis et al. |
| 2013/0113784 | A1 | 5/2013 | White et al. |
| 2013/0141421 | A1 | 6/2013 | Mount et al. |
| 2013/0321255 | A1 | 12/2013 | Lamb et al. |
| 2014/0002442 | A1* | 1/2014 | Lamb ................ G06F 3/1431 345/419 |
| 2014/0152558 | A1 | 6/2014 | Salter et al. |
| 2014/0333665 | A1* | 11/2014 | Sylvan ............... G02B 27/0149 345/633 |
| 2015/0198808 | A1* | 7/2015 | Morifuji ............ H04N 13/044 345/8 |
| 2016/0091720 | A1* | 3/2016 | Stafford ............ G02B 27/0172 345/8 |

FOREIGN PATENT DOCUMENTS

| | | |
|---|---|---|
| WO | 2004113991 A2 | 12/2004 |
| WO | 2012062681 A1 | 5/2012 |
| WO | 2014155072 A2 | 10/2014 |

OTHER PUBLICATIONS

Steptoe, William, "William Steptoe- AR-Rift: Aligning Tracking and Video Spaces", Published on: Nov. 27, 2013 Available at; http://willsteptoe.com/.

Davis, Brad, "Understanding Matrix Transformations for Rendering to the Oculus Rift", Published on: Oct. 14, 2013 Available at: http://rifty-business.blogspot.in/2013/10/understanding-matrix-transformations.html.

Li, et al., "Minication Affects Action-Based Distance Judgments in Oculus Rift HMDs", In Proceedings of the ACM Symposium on Applied Perception, Aug. 8, 2014, pp. 91-94.

Wilson, et al., "Steerable Augmented Reality with the Beamatron", In Proceedings of the 25th annual ACM symposium on User interface software and technology, Oct. 7, 2012, 10 pages.

Duchowski, et al., "Binocular Eye Tracking in VR for Visual Inspection Training", In Proceedings of the ACM symposium on Virtual reality software and technology, Nov. 15, 2001, 8 pages.

Azuma, et al., "Improving Static and Dynamic Registration in an Optical See-through HMD", In Proceedings of the 21st annual conference on Computer graphics and interactive techniques, Jul. 24, 1994, 17 pages.

Liu, et al., "An Optical See-Through Head Mounted Display with Addressable Focal Planes", In 7th IEEE/ACM International Symposium on Mixed and Augmented Reality, Sep. 15, 2008, pp. 33-42.

Aliaga, Daniel G., "Virtual and Real Object Collisions in a Merged Environment", In Master's Thesis, Retrieved on: Nov. 13, 2014, 59 pages.

Antonov, et al., "SDK Overview SDK Version 0.2.5", Published on: Oct. 9, 2013 Available at: http://static.oculusvr.com/sdk-downloads/documents/Oculus_SDK_Overview.pd.

Best, Scot, "Perceptual and Oculomotor Implications of Interpupillary Distance Settings on a Head-Mounted Virtual Display", In Proceedings of the IEEE 1996 National Aerospace and Electronics Conference, vol. 1, May 20, 1996, 6 pages.

Whiting, Nick, "Integrating the Oculus Rift into Unreal Engine 4", Published on: Jun. 11, 2013, Available at: http://gamasutra.com/blogs/NickWhiting/20130611/194007/Integrating_the_Oculus_Rift_into_Unreal_Engine_4.php.

ISA European Patent Office, International Search Report and Written Opinion Issued in Application No. PCT/US2016/030337, Sep. 6, 2016, WIPO, 16 pages.

IPEA European Patent Office, Second Written Opinion Issued in PCT Application No. PCT/US2016/030337, dated Apr. 11, 2017, WIPO, 7 pages.

* cited by examiner

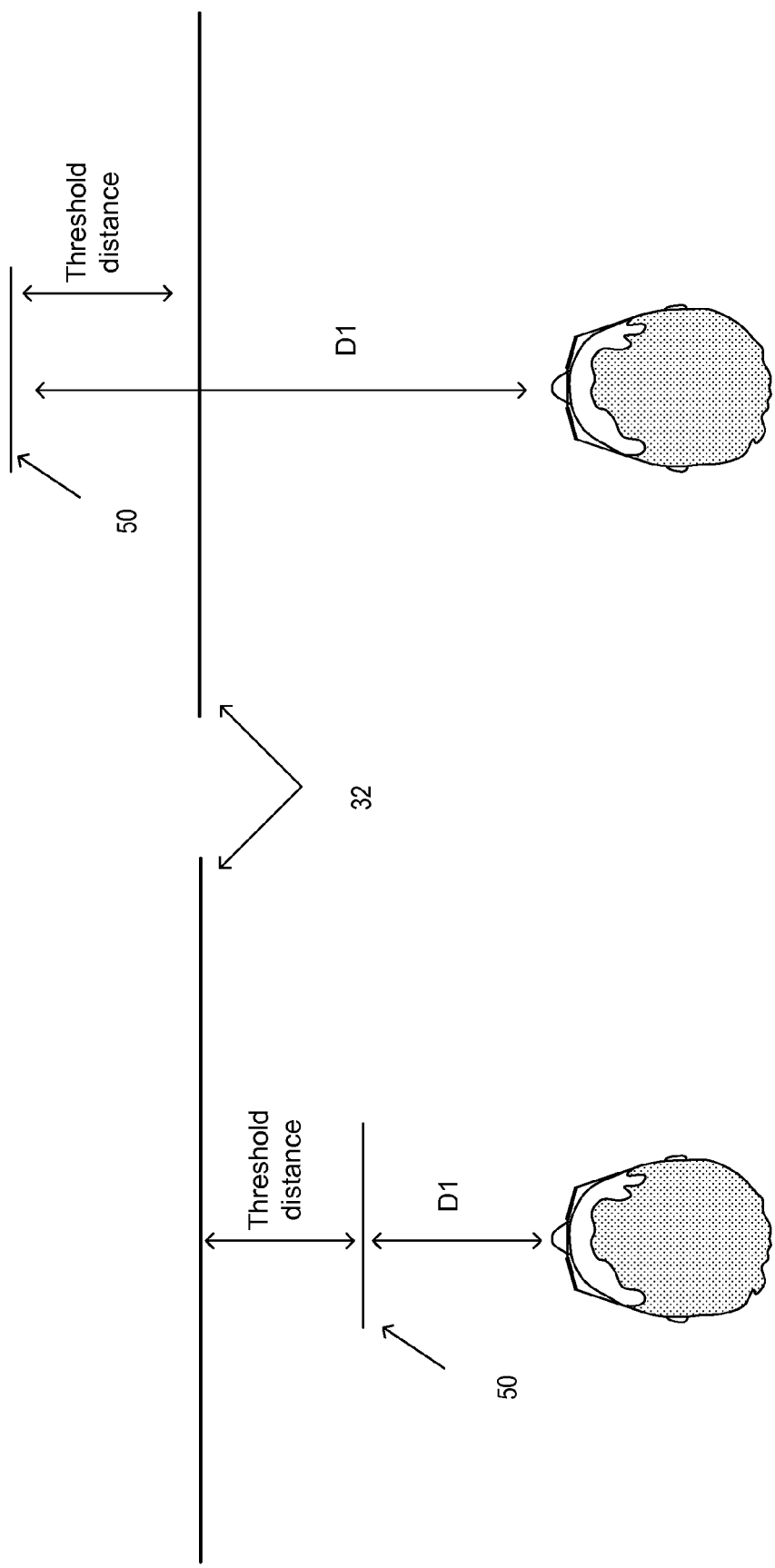

ALIGNMENT BASED VIEW MATRIX TUNING

BACKGROUND

Recently, various technologies have emerged that allow users to experience a blend of reality and virtual worlds. For example, head-mounted display (HMD) devices may include high definition cameras, depth cameras, range finders, gyroscopes, accelerometers, and other technologies that allow the HMD device to map the real world and to display a blend of reality and virtual objects on the HMD device. These HMD devices may include stereoscopic displays that use stereopsis to achieve 3D visuals by displaying separate images with appropriately translated positions to each eye of the user. When using stereopsis techniques, the perceived depth of the 3D visual will depend upon the inter-pupillary distance (IPD) of the user. Rather than calculating an accurate IPD for the user, stereoscopic HMD devices will often be calibrated to an average IPD for a population of users. Differences between a user's actual IPD and the average IPD may result in some changes in how the visuals are perceived by the user, as discussed below; however, those changes may be less perceptible when viewing an immersive virtual reality experience, as opposed to augmented reality experience, because the user has no frame of reference in the real world against which the displayed visuals can be compared. However, even in a virtual reality experience, an incorrect IPD may cause user discomfort. Additionally, if the IPD error is too large, the user may be unable to verge the left and right images displayed to the user's left and right eyes, causing the user to see double, and generally degrading the user's experience of the virtual reality.

The approach of using an average IPD for a user population has several drawbacks in HMD devices for displaying augmented reality experiences, which comprise at least partially see-through displays that allow superposition of displayed images over a real-world background environment. As the user is seeing the real-world, and not just a virtual representation of the real-world on a display, the real-world background environment provides a ground truth reference frame for the user. A deviation between the user's actual IPD and the IPD used by the HMD device will affect only the user's perception of the virtual objects displayed on the HMD device, while the ground truth real-world background environment will remain unchanged. Consequently, this imprecision in IPD can cause the virtual objects to either appear to be an incorrect size or appear to be in an incorrect location compared to the real-world background environment, degrading the user experience.

SUMMARY

To address these issues, a head-mounted display device (HMD device) and method are provided for alignment based view matrix tuning. The HMD device may comprise an at least partially see-through display, a processor and a non-volatile storage device holding instructions executable by the processor to detect a physical feature having a physical location that is at least a threshold distance away from a rendering focal plane of the head-mounted display device, generate an alignment hologram based on the physical feature, determine a view of the alignment hologram based on a default view matrix for a first eye of a user of the head-mounted display device, display the view of the alignment hologram to the first eye of the user on the at least partially see-through display, output an instruction to the user to enter an adjustment input to visually align the alignment hologram with the physical feature, determine a calibrated view matrix based on the default view matrix and the adjustment input, and adjust a view matrix setting of the head-mounted display device based on the calibrated view matrix.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8A shows a physical object that is detected at a location that is a threshold distance in front of a rendering focal plane of the head-mounted display device of FIG. 1 according to an embodiment of the present description.

FIG. 8B shows a physical object that is detected at a location that is a threshold distance behind a rendering focal plane of the head-mounted display device of FIG. 1 according to an embodiment of the present description.

DETAILED DESCRIPTION

The present descriptions relates to alignment based view matrix tuning of a head-mounted display (HMD) device to provide an immersive augmented reality experience that is calibrated to the user's specific eye characteristics, such as inter-pupillary distance, to reduce eye strain and promote consistent quality of operation. More particularly, the present description relates to generating an alignment hologram that corresponds to a physical object in the world, such as a poster or picture frame. The physical object has a physical location relative to the user of the HMD device that may be detected using depth cameras, range finders, or other suitable technology. Accordingly, the alignment hologram can be generated such that it overlaps with the physical object in a corresponding location in a virtual world of the HMD device.

The HMD device may then render and display the alignment hologram from the perspective of a view matrix that is a proxy for an eye of the user. If the view matrix accurately reflects the user's eye characteristics, such as inter-pupillary distance, then a view of the alignment hologram rendered from the perspective of the view matrix will match what the user's eye should actually see. More particularly, the alignment hologram will appear to the user to be visually aligned with the physical object in the real world.

However, if the view matrix does not accurately reflect the user's eye characteristics, then the user will perceive that the alignment hologram has a different location, orientation, or size than intended by the HMD device. Through the alignment based view matrix tuning process, the user may enter adjustment inputs that will shift the location and characteristics of the view matrix, which will correspondingly shift the view of the alignment hologram displayed on the HMD device. Accordingly, the user can enter adjustment inputs until the alignment hologram appears to be visually aligned with the physical object in the real world. Once the alignment hologram is aligned with the physical object, then the corresponding view matrix will accurately reflect the user's actual eye characteristics, and the HMD device can be calibrated to the adjusted view matrix. This process may be repeated for the user's second eye in order to attain calibrated view matrices for both of the user's eyes. Accordingly, the user's eye characteristics can then be determined based on the calibrated view matrices. For example, the user's inter-pupillary distance can be determined by calculating the length of a chord between the calibrated view matrix for the user's left eye and the calibrated view matrix for the user's right eye.

Figure 1:
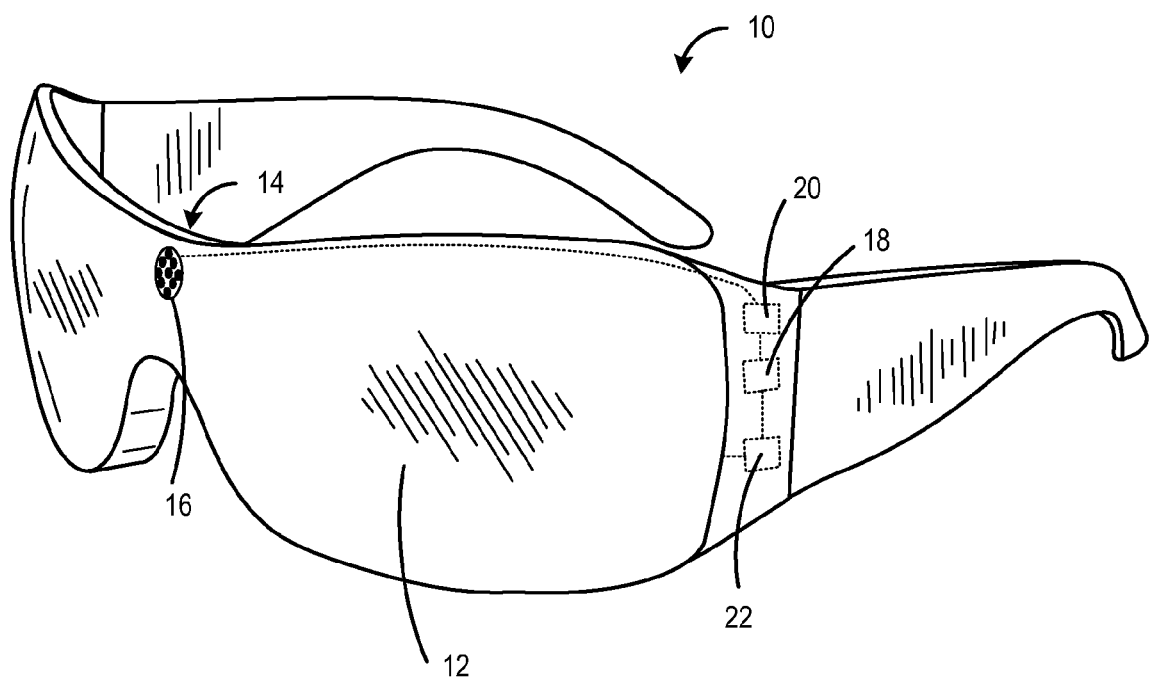
FIG. 1 shows a head-mounted display device according to an embodiment of the present description.

FIG. 1 illustrates an example HMD device 10. The illustrated HMD device 10 takes the form of wearable glasses or goggles, but it will be appreciated that other forms are possible. The HMD device 10 includes an at least partially see-through stereoscopic display 12 that may be configured to visually augment an appearance of a physical environment being viewed by the user through the at least partially see-through stereoscopic display. In some examples, the at least partially see-through stereoscopic display 12 may include one or more regions that are transparent (e.g., optically clear) and may include one or more regions that are opaque or semi-transparent. In other examples, the at least partially see-through stereoscopic display 12 may be transparent (e.g., optically clear) across an entire usable display surface of the stereoscopic display 12.

For example, the HMD device 10 may include an image production system 22 that is configured to display virtual objects to the user with the at least partially see-through stereoscopic display 12, which are visually superimposed onto the physical environment so as to be perceived at various depths and locations. The HMD device 10 may use stereoscopy to visually place a virtual object at a desired depth by displaying separate images of the virtual object to both of the user's eyes. To achieve the perception of depth, the image production system 22 of the HMD device 10 may render the two images of the virtual object at a rendering focal plane of the HMD device 10, such that there is a binocular disparity between the relative positions of the virtual object in the two images. For example, this binocular disparity may be a horizontal disparity where the relative positions of the virtual object in the two images is separated by a distance in the x axis direction. In this embodiment, the x axis may be defined as the axis extending horizontally to the left and the right relative to the user, the y axis extending upward and downward vertically relative to the user, and the z axis extending forward and backward relative to the user, orthogonally to the x and y axes.

The horizontal disparity between the relative positions of the virtual object in the two images will cause the user to perceive that the virtual object is located at a certain depth within the viewed physical environment due to stereopsis. Using this stereoscopy technique, the HMD device 10 may control the displayed images of the virtual objects, such that the user will perceive that the virtual objects exist at a desired depth and location in the viewed physical environment.

The HMD device 10 includes an optical sensor system 14 that may include one or more optical sensors. In one example, the optical sensor system 14 includes an outward facing optical sensor 16 that may be configured to detect the real-world background from a similar vantage point (e.g., line of sight) as observed by the user through the at least partially see-through stereoscopic display 12. The optical sensor system 14 may include a variety of additional sensors, such as a depth camera and an RGB camera, which may be a high definition camera or have another resolution.

The HMD device 10 may further include a position sensor system 18 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensor system 14 and/or position sensor information received from position sensor system 18 may be used to assess a position and orientation of the vantage point of the at least partially see-through stereoscopic display 12 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined with an on-board computing system (e.g., on-board computing system 20) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

Figure 2:
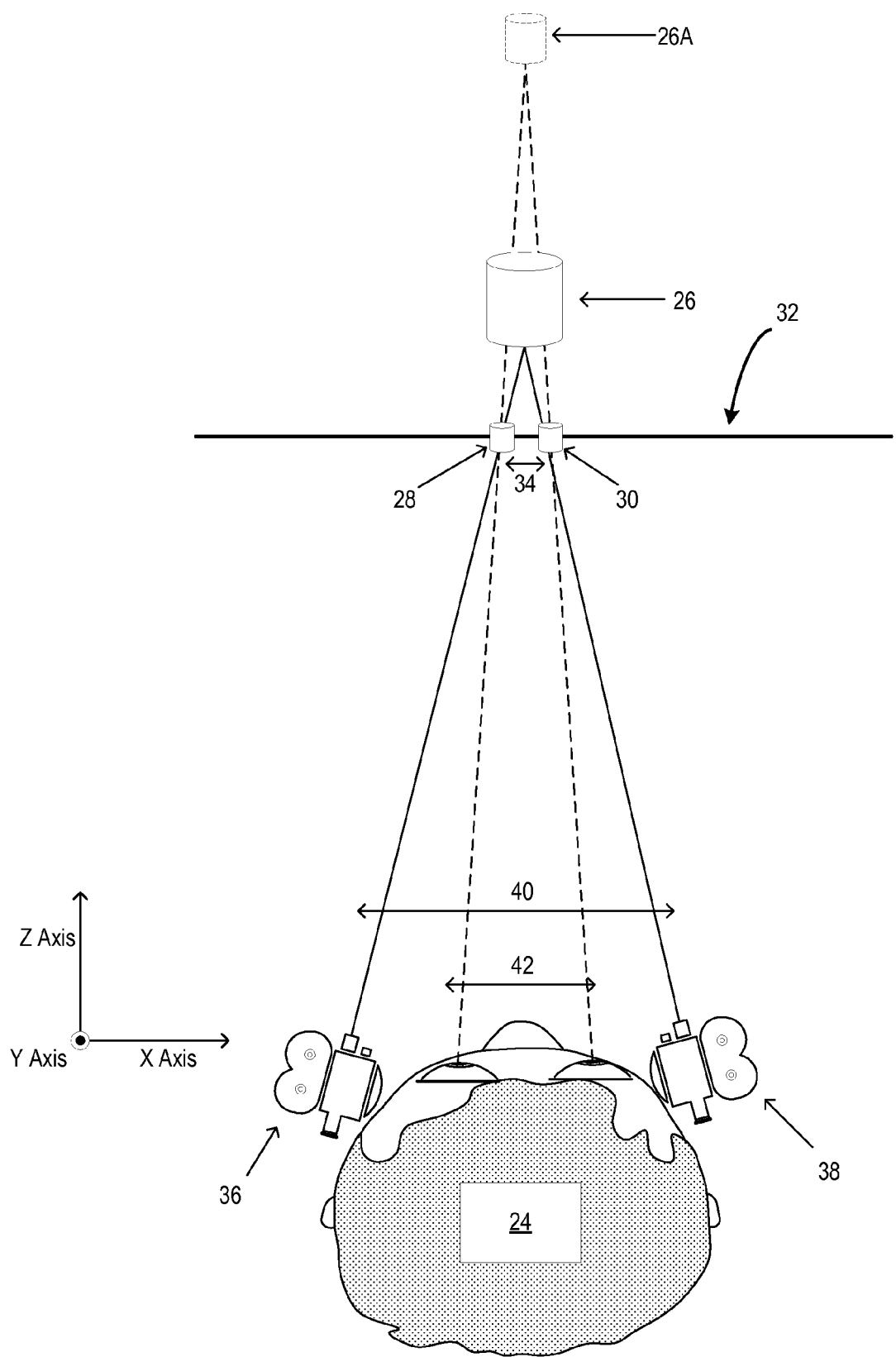
FIG. 2 shows a world-locked virtual object rendered with an incorrect inter-pupillary distance.

Now turning to FIG. 2, in order to display virtual object 26 at the illustrated depth and location using stereoscopy, the HMD device 10 displays the left image 28 to the left eye of the user 24, and displays the right image 30 to the right eye of the user 24. The left image 28 and the right image 30 are rendered at the rendering focal plane 32 of the HMD device 10. As illustrated in FIG. 2, the left image 28 and the right image 30 are rendered with a horizontal disparity 34 between their relative positions in the two images.

The left image 28 and the right image 30 are rendered by the HMD device 10 from the perspective of the left virtual camera 36 and the right virtual camera 38. It will be appreciated that the left virtual camera 36 and the right virtual camera 38 visually represent view matrices in the software of the HMD device 10. The view matrices are used to project the virtual world of the HMD device 10 onto a specific perspective. That is, the view matrix represented by the left virtual camera 36 is used by the HMD device 10 to model what the left eye of the user would see when looking at the virtual world from the location and orientation of the left virtual camera 36. Similarly, the view matrix represented by the right virtual camera 38 is used by the HMD device 10 to model what the right eye of the user would see when looking at the virtual world from the location and orientation of the right virtual camera 38.

As illustrated in FIG. 2, the relative positions of the left virtual camera 36 and the right virtual camera 38 are separated by a distance 40 from each other in the x axis. This distance 40 represents an initial preset IPD of the HMD device 10. However, it will be appreciated that the initial preset IPD represented by the distance 40 may be different than the user's actual IPD 42 as shown in FIG. 2. Consequently, when viewing the left image 28 and the right image 30, the user will not actually perceive that the virtual object 26 is located at its desired depth. Instead, the user will perceive that the virtual object 26 exists at the depth and location illustrated by the perceived virtual object 26A.

It will be further appreciated that IPD is not the only eye characteristic for which the view matrices may be calibrated. For example, the user's eyes may not be symmetrically aligned on the user's face. That is, one of the user's eyes may be slightly lower or higher than the other eye or one of the user's eyes may be slightly closer to or farther away from the user's nose than the other eye. If the view matrices used by HMD device are tuned for a user with symmetrically aligned eyes, then a user with asymmetrically aligned eyes will similarly perceive that the virtual object 26 is located in an incorrect location relative to the virtual world of the HMD device.

Figure 3:
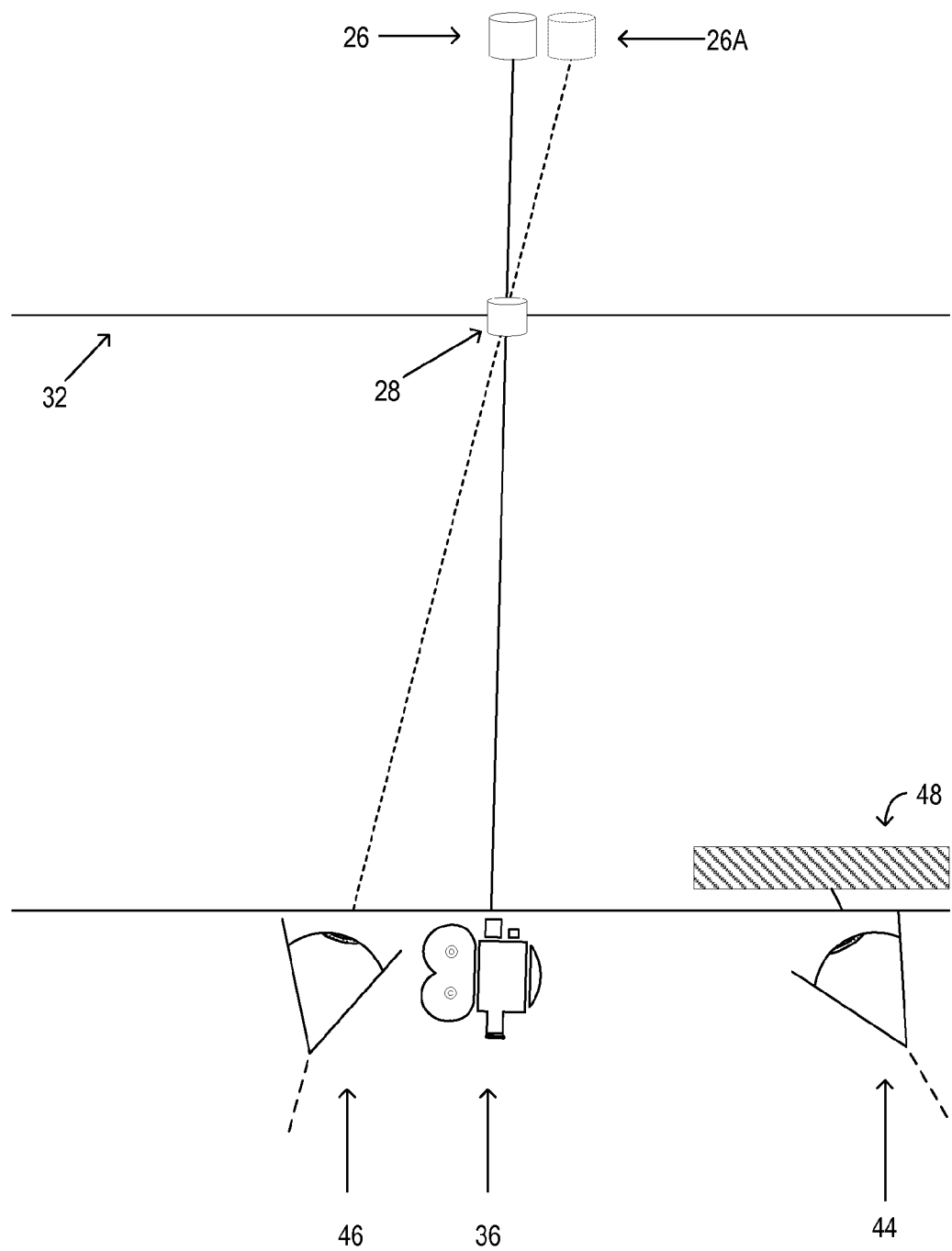
FIG. 3 shows a world-locked virtual object rendered for a single eye with an incorrect inter-pupillary distance.

Now turning to FIG. 3, IPD error for a single eye system is illustrated. In this example, a view of the virtual object 26 from the perspective of the left virtual camera 36 results in the left image 28 being rendered at the rendering focal plane 32 of the HMD device 10. In this example, the HMD device 10 does not render a view of the virtual object 26 from the perspective of a right virtual camera because the right eye 44 of the user cannot see the virtual object 26 due to the obstruction 48. In one example, the obstruction 48 may be a region of the at least partially see-through display 12 corresponding to the user's second eye that has an increased opacity, such that the user's right eye 44 does not see a rendered view of the virtual object 26.

As illustrated in FIG. 3, when viewing the left image 28 with the user's left eye 46, the user will not perceive that virtual object 26 exists at the location and depth intended by the HMD device 10. In this example, due to the user's IPD being larger than the default IPD, the user's left eye 46 is shifted to the left relative to the left virtual camera 36. Consequently, when viewing the left image 28 displayed on the at least partially see-through display 12 at the rendering focal plane 32, the user will perceive the perceived virtual object 26A, which is shifted to the right of the intended location of the virtual object 26. It will be appreciated that the human eye is acutely sensitive to alignment errors. Even small discrepancies between the initial preset default IPD of the HMD device 10 and the user's actual IPD, will cause the user to perceive that the virtual objects rendered by the HMD device are in incorrect locations and depths relative to the HMD device's virtual world. As illustrated in FIG. 2 and FIG. 3, this error occurs in both two eye and one eye systems. This error is particularly noticeable to the user in augmented reality embodiments, where the real world provides a ground truth reference frame, and incorrect locations of virtual object becomes obvious, which generally degrades the user experience.

Figure 4:
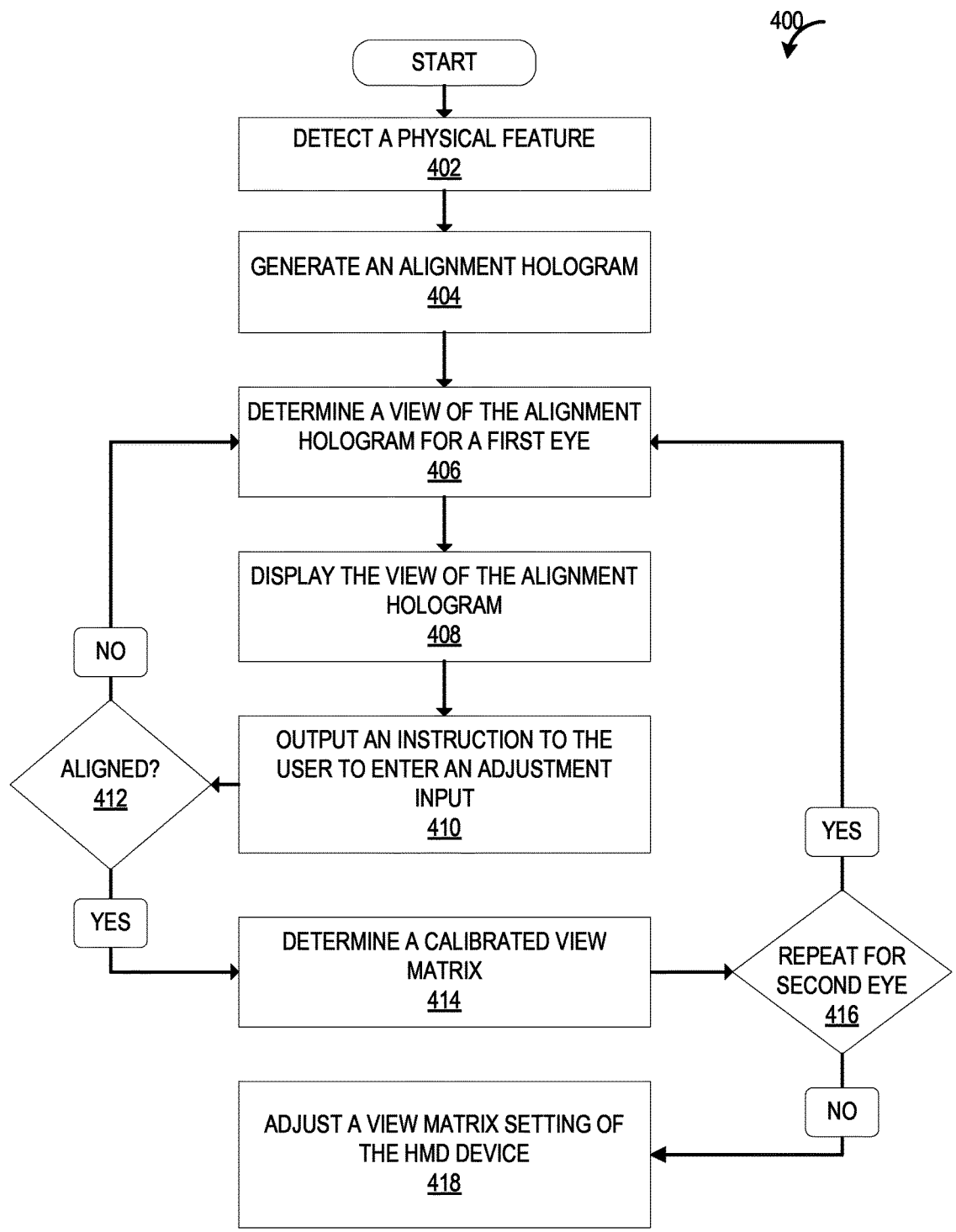
FIG. 4 shows a method of calibrating a head-mounted display device using alignment based view matrix tuning according to an embodiment of the present description.

FIG. 4 shows an example method 400 for alignment based view matrix tuning of an HMD device according to an embodiment of the present description. At step 402, the method 400 may include detecting a physical feature. In one example, the physical feature is detected by the optical sensor system 14 of the HMD device 10, which may include the outward facing optical sensor 16 and a depth camera. In this embodiment, it may be advantageous to only proceed with method 400 upon detection of physical features that are at least a threshold distance away from a rendering focal plane of the HMD device 10. In one example, the threshold distance may be 20% to 40% of the distance from the HMD device 10 to the rendering focal plane. However, it will be appreciated that other threshold distances are possible, such as 25%-35% of the distance from the HMD device 10 to the rendering focal plane. Distances in these ranges provide a viewing experience that will enable the user to easily perceive misalignment (and subsequent improvement in alignment) of the hologram with physical feature of the real world object, and thus more easily and accurately calibrate the viewing matrix. However, in other examples, the threshold distance may be less than 20% or more than 40% of the distance from the HMD device 10 to the rendering focal plane.

Additionally, the physical features may be indicia on a 2D surface of a physical object. In one example, the physical object may be a two dimensional planar surface such as a poster. The poster may have physical features that are identifiable by the optical sensor system 14 of the HMD device 10. For example, the physical features may be indicia such as optical tags or identifiable markings. In one embodiment of the poster, the physical features are optical tags that may be located in a central region and/or a peripheral region of the 2D surface of the poster. Additionally, the poster may be pre-known to the HMD device 10, such that the characteristics and physical features of the poster are stored in a non-volatile storage device of the HMD device 10, and the corresponding alignment hologram programmatically generated for display or pre-stored on the non-volatile storage device and retrieved for display. Thus, for example, a virtual copy of the poster may be stored on the HMD device 10. While a poster is used in this example, it will be appreciated that other forms of the physical object are possible. In another embodiment, the physical feature may be a selected unknown physical object in the real world viewed by the head-mounted display device, such as a painting or picture frame on the wall. In this example, the physical object is not pre-known to the HMD device 10, and the characteristics of the physical object such as height and width are determined based the images captured by optical sensor system 14.

Proceeding from step 402 to step 404, the method 400 may include generating an alignment hologram. In one example, the alignment hologram may be generated based on the physical feature. More particularly, the alignment hologram may be a virtual copy of the physical feature. In this example, the alignment hologram may not necessarily be a complete virtual copy, but may take the form of an entire or partial outline of the physical feature, an edge of the virtual feature, a shape that is complimentary to a portion of the physical feature, etc. It will be appreciated that other forms of alignment holograms are possible, such as a targeting reticle or horizontal and vertical alignment lines. Additionally, it will be appreciated that the physical feature may take many kinds of different forms. For example, the physical feature may be either two dimensional (2D) or three dimensional (3D). Accordingly, the corresponding alignment hologram may also be 2D or 3D.

In the example where the physical feature is indicia on a 2D surface such as a poster that is pre-known to the HMD device 10, the alignment hologram may be directly generated based on the virtual copy and characteristics of the poster stored on the HMD device. In the example where the physical feature is a selected unknown physical object in the real world without pre-known characteristics, the alignment hologram may be generated real time based on a captured image received at an outward facing camera of the optical sensor system 14 of the HMD device 10. For example, image analysis may be performed on the captured image and other sensor data such as depth information received from a depth camera of the optical sensor system 14. From the image analysis, characteristics such as the height and width of the selected unknown physical object may be calculated, and a corresponding alignment hologram may be generated in real time. It will be appreciated that virtually any object that can be detected by the HMD device 10 and has a suitable shape and size for generating an alignment hologram may be used.

Advancing from step 404 to step 406, the method 400 may include determining a view of the alignment hologram. In one example, the view of the alignment hologram is determined based on a default view matrix for a first eye of a user of the HMD device 10. In this example, the alignment hologram has a location in the virtual world of the HMD device 10 that directly corresponds to the physical location of the physical feature relative to the HMD device 10. The view of the alignment hologram is determined based on the location and orientation of the default view matrix relative to the alignment hologram in the virtual world of the HMD device 10. Using the default view matrix, the HMD device 10 renders an image of the alignment hologram at the rendering focal plane of the HMD device 10. It will be appreciated that from the virtual perspective of the default view matrix, the alignment hologram will be aligned with the physical feature because the virtual location of the alignment hologram directly corresponds to the physical location of the physical feature.

Proceeding from step 406 to step 408, the method 400 may include displaying the view of the alignment hologram determined in step 404. In one example, the view of the alignment hologram is displayed to the first eye of the user on the at least partially see-through display of the HMD device 10. It will be appreciated that the view of the alignment hologram was rendered and displayed based on the characteristics of the default view matrix, such as the view matrix's location and orientation in the virtual world. Consequently, because the characteristics of the default view matrix may deviate from the actual characteristics of the user's eye such as IPD, the user may perceive that the alignment hologram is located in an incorrect position or depth relative to the real world environment. As a result, the user may perceive that the alignment hologram is not actually aligned with the physical feature.

Advancing from step 408 to step 410, the method 400 may include outputting an instruction to the user to enter an adjustment input. In one example, the HMD device outputs an instruction to the user to enter an adjustment input to visually align the alignment hologram with the physical feature. For example, the adjustment input may include input to translate the alignment hologram along one or more of an x, y, or z axis. In this example, the x axis may be the axis extending horizontally to the left and right relative to the user, the y axis may be the axis extending vertically upwards and downwards relative to the user, and the z axis may be the axis extending forward and backward relative to the user, orthogonal to the x and y axes. It will be appreciated that while from the user's perspective the alignment hologram will appear to be moving as the adjustment inputs are entered, the alignment hologram may be in fact world-locked in the virtual world of the HMD device 10. Rather than the alignment hologram moving, the adjustment input may change the characteristics of the default view matrix such as orientation and location. By changing the orientation and location of the default view matrix, the view of the alignment hologram being displayed to the user will also change, and the user will perceive a corresponding change in the location of the alignment hologram.

In another example, the adjustment input may further include input to rotate the alignment hologram in one or more of a pitch, yaw, or roll rotation. Similarly to translating along the x, y, and z axes, the alignment hologram may be world-locked in the virtual world of the HMD device, even though the alignment hologram may appear to be rotating to the user. In this example, an adjustment input to rotate the alignment hologram in a pitch, yaw, or roll rotation may actually change a pitch, yaw, and roll characteristic of the default view matrix. The rotation to the default view matrix will have a corresponding effect on the view of the alignment hologram displayed to the user, and the user will perceive this effect on the view of the alignment hologram as the alignment hologram itself rotating.

It will be appreciated that the instruction may be outputted to the user through virtually any communication medium, such as through sounds or visuals displayed on the at least partially see-through stereoscopic display 12. Additionally, the user may input a selection through virtually any communication medium, such as through voice-activated input detected by a microphone of the HMD, a keyboard coupled by wired or wireless link to the HMD, or hand gestures detected by a depth camera of the HMD.

Proceeding from step 410 to step 412, the method 400 may include determining whether the adjustment input received in step 410 indicated that the user perceives that the alignment hologram is aligned with the physical feature. In an example where the adjustment input is an input to translate or rotate the alignment hologram, then method 400 may perform additional iterations of steps 406-410. In this example, the method 400 may proceed from step 412 back to step 406, and includes determining an iterated view of the alignment hologram based on the default view matrix that has been adjusted by the adjustment input entered by the user in step 410. The method 400 advances through the iteration from step 406 to step 408, and includes displaying the iterated view of the alignment hologram to the first eye of the user on the at least partially see-through display. The method 400 proceeds through the iteration from step 408 to step 410, and includes outputting another instruction to the user to enter an adjustment input to translate or rotate the alignment hologram. It will be appreciated that the method 400 may iterate through steps 406-410 multiple times until the user indicates that the alignment hologram is visually aligned with the physical feature.

Advancing from step 412 to step 414, the method 400 may include determining a calibrated view matrix. In one example, the calibrated view matrix is determined based on the default view matrix and the adjustment input. It will be appreciated that in the example where method 400 has iterated multiple times through steps 406-410, the calibrated view matrix may be based on multiple adjustment inputs entered by the user at each iteration. In another example, the default view matrix that has been adjusted by the adjustment input may directly be used as the calibrated view matrix.

Proceeding from step 414 to step 416, the method 400 may include repeating steps 406-414 for a second eye of the user in an embodiment where the view matrices for each eye of the user are calibrated separately. In this embodiment, the method 400 proceeds from step 416 back to step 406 and includes determining a second view of the alignment hologram. In one example, the second view of the alignment hologram is determined based on a second default view matrix for a second eye of the user of the HMD device 10. In this example, the second default view matrix represents a view for the second eye of the user. Accordingly, the second default view matrix will have a position in the virtual world that is translated a distance corresponding to the default IPD from the default view matrix for the first eye. This is, the default view matrix for the first eye and the second default matrix for the second eye will be separated by a distance corresponding to the default IPD. It will be appreciated that similarly to the default view matrix for the user's first eye, the second default view matrix for the user's second eye may not accurately reflect the user's actual eye characteristics. Additionally, it will be appreciated that the default location and orientation of the second default view matrix may be determined through many methods. For example, because the average user may not have symmetric PDs, it may be advantageous to determine the characteristics of the second default view matrix based on the average PDs of the population of users rather than the average IPD. That is, the user's right eye may be closer or farther away from the user's nose than the user's left eye. Accordingly, it may be advantageous to determine the default location and orientation of the second default view matrix based on the average PD for the eye for which the second default view matrix is a proxy.

Advancing from step 406 to step 408, the method 400 may include displaying the second view of the alignment hologram determined in step 406 for the second eye of the user. In one example, the second view of the alignment hologram is displayed to the second eye of the user on the at least partially see-through display. It will be appreciated that similarly to the default view matrix for the first eye, the second default matrix for the second eye may not accurately correspond to the actual characteristics of the user's second eye. Consequently, when looking at the second view of the alignment hologram on the at least partially see-through display with the user's second eye, the user may perceive that the alignment hologram is not aligned with the physical feature.

Proceeding from step 408 to step 410, the method 400 may include outputting a second instruction to the user to enter a second adjustment input to visually align the alignment hologram with the physical feature. Similarly to the first adjustment input, the second adjustment input may include inputs to translate the alignment hologram in one or more of the x, y, or z axis and rotate the alignment hologram with one or more of a pitch, yaw, or roll rotation.

Advancing from step 410 to step 412, the method 400 may iterate back through steps 406-410 to iteratively adjust the second default view matrix for the user's second eye until the user perceives that the alignment hologram is aligned with the physical feature.

Proceeding from step 412 to step 414, the method 400 may include determining a second calibrated view matrix based on the second default view matrix and the second adjustment input. Similarly, the second calibrated view matrix may be determined based on multiple adjustment inputs entered by the user. In another example, the second calibrated view matrix may be directly based on the second default view matrix that was adjusted by the adjustment inputs entered by the user in step 410.

In the embodiment where the calibrated view matrix is determined for the first eye of the user separately from the second calibrated view matrix for the second eye of the user, it may be advantageous to block the view of the eye that is not currently being calibrated. For example, simultaneously to the method 400 advancing through steps 406-414 for the default matrix for the first eye of the user, the HMD device may increase an opacity of a region of the at least partially see-through display corresponding to the second eye of the user. In this example, the opacity may be increased such that both the physical feature and the alignment hologram are not viewable (or are made difficult to view) by the second eye of the user. By increasing the opacity of the region of the at least partially see-through display corresponding to the eye not being calibrated, the alignment based view matrix tuning process can be isolated to one eye at a time.

After determining the calibrated view matrix for the first eye of the user and the second calibrated view matrix for the second eye of the user, the method 400 advances to step 418 and includes adjusting a view matrix setting of the HMD device. In one example, the view matrix setting is adjusted based on the calibrated view matrix for the first eye of the user. In the embodiment where the second calibrated view matrix is determined for the second eye of the user, the view matrix setting is additionally adjusted based on the second calibrated view matrix. In one example, adjusting the view matrix setting may comprise storing the calibrated view matrix and the second calibrated view matrix on the HMD device. Accordingly, when displaying any holograms in the future for any application on the HMD device, the HMD device may use the stored calibrated view matrix for the first eye and the second calibrated view matrix for the second eye to render and display images of the future holograms.

Figure 5:
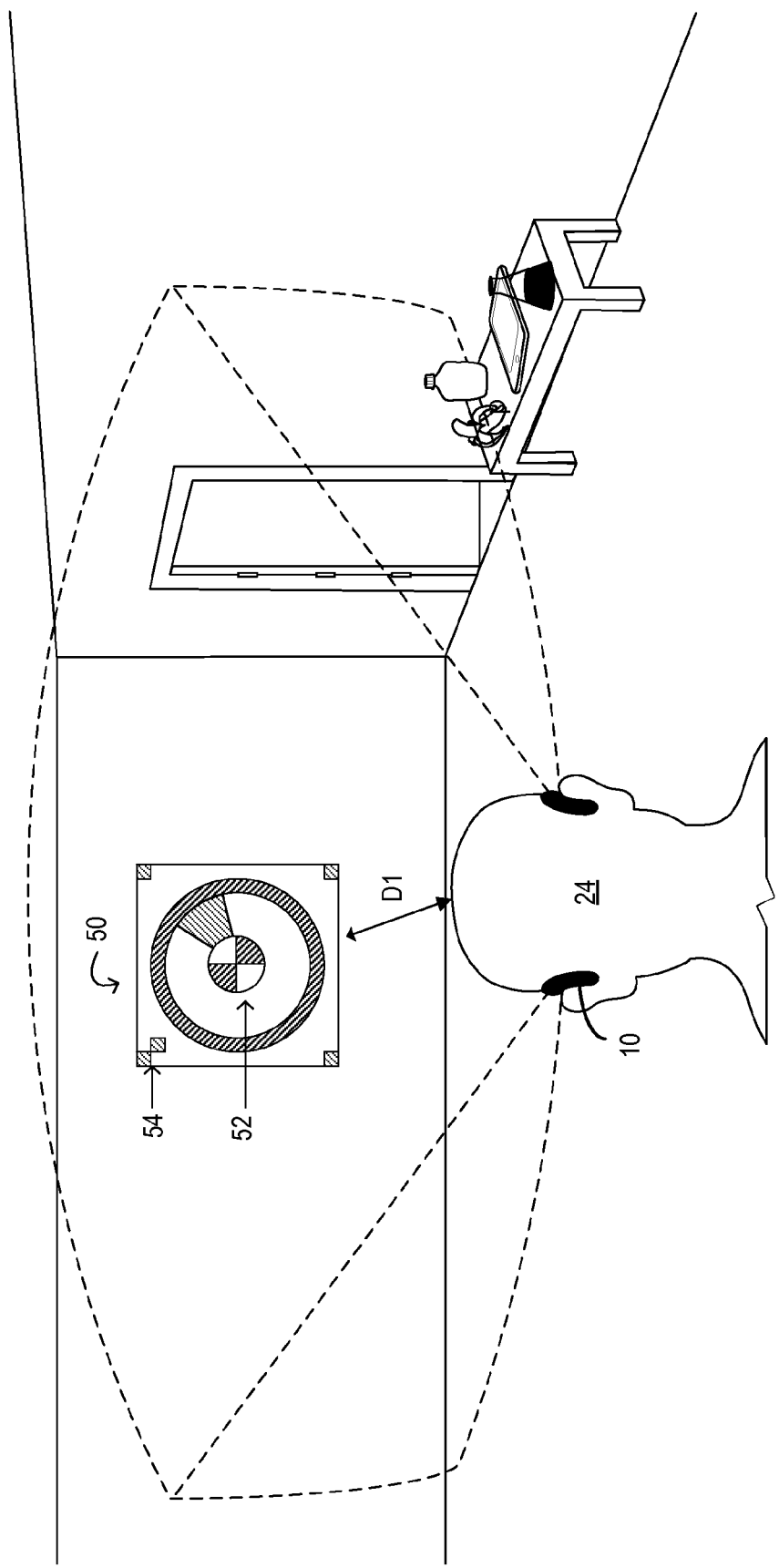
FIG. 5 shows an example physical feature detected by the head-mounted display device of FIG. 1 according to an embodiment of the present description.

Now turning to FIG. 5, an embodiment where the physical feature is indicia on a 2D surface of a physical object is illustrated. As shown in FIG. 5, there are a plurality of physical features, for example the optical tag 52 that is located in a center region of the 2D surface of the physical object 50. A second optical tag 54 is located at a peripheral location of the 2D surface of the physical object 50. In this example, the optical sensor system 14 of the HMD device 10 captures images of the physical features 52 and 54, and the HMD device 10 performs image analysis on the captured images to detect and identify the physical features 52 and 54. Additionally, depth cameras of the optical sensor system 14 may measure the distance D1 between the user 24 of the HMD device and the physical object 50. Using the visual and depth data captured by the optical sensor system 14, the HMD device 10 may generate a virtual world corresponding to the real world environment viewed by the HMD device 10. Additionally, it will be appreciated that while FIG. 5 illustrates a poster mounted to a wall, virtually any planar object could be used as the physical object 50. For example, the physical object 50 could be any poster or painting, a magazine on a table, a trinket with a flat surface on a shelf, or virtually any other planar object.

Figure 6:
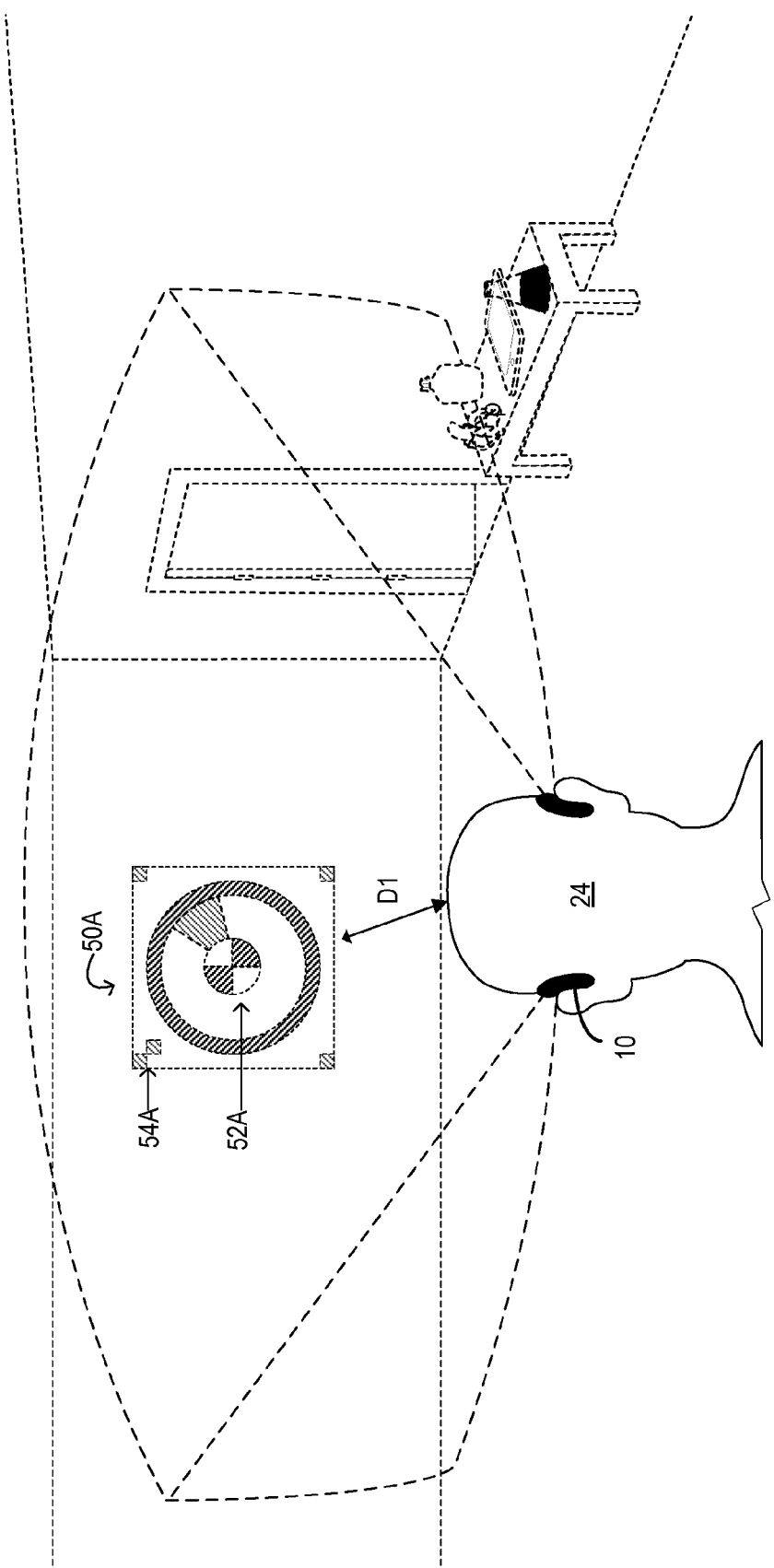
FIG. 6 shows an example virtual world including an alignment hologram generated by the head-mounted display device of FIG. 1 according to an embodiment of the present description.

FIG. 6 illustrates an example virtual world 56 generated by the HMD device 10 after image analysis of the visual data captured by the optical sensor system 14 of the HMD device 10. In this example, a virtual copy 50A of the physical object 50 is generated by the HMD device 10 to be used as an alignment hologram. The virtual copy 50A also includes virtual feature 52A that is located at a central region of the virtual object 50A and a second virtual feature 54A that is located at a peripheral region of the virtual object A. Additionally, in the virtual world, the virtual object 50A is located at a position that is the distance D1 from the location of the HMD device 10. It will be appreciated that this distance D1 between the virtual object 50A and the HMD device 10 is the same distance D1 between the physical object 50 and the HMD device 10 in the real world as illustrated in FIG. 5.

Figure 7B:
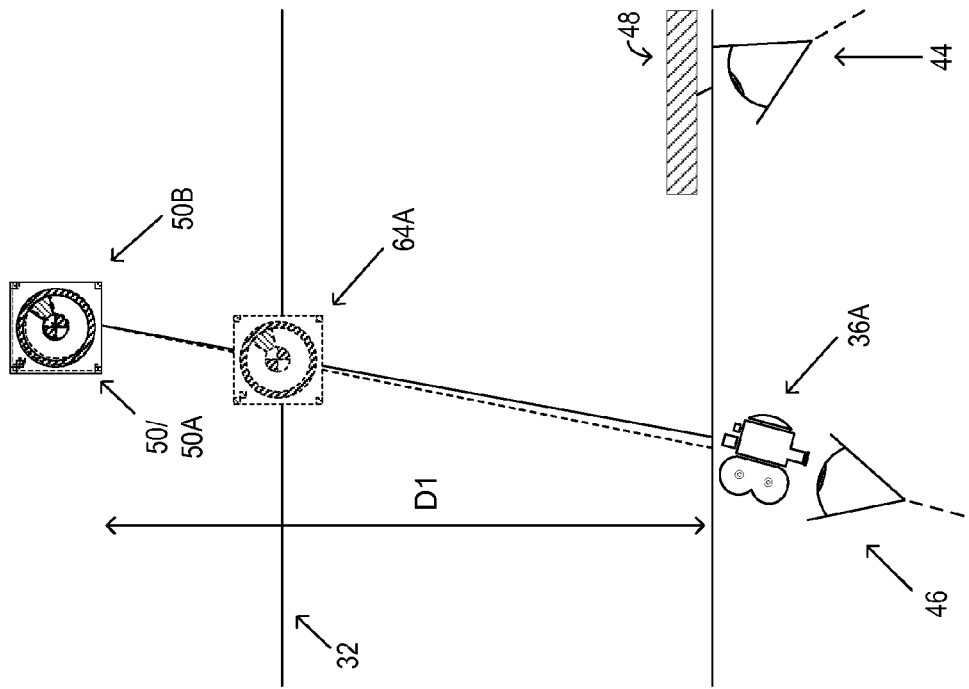
FIG. 7B shows an alignment hologram rendered with a correct inter-pupillary distance according to an embodiment of the present description.
Figure 7A:
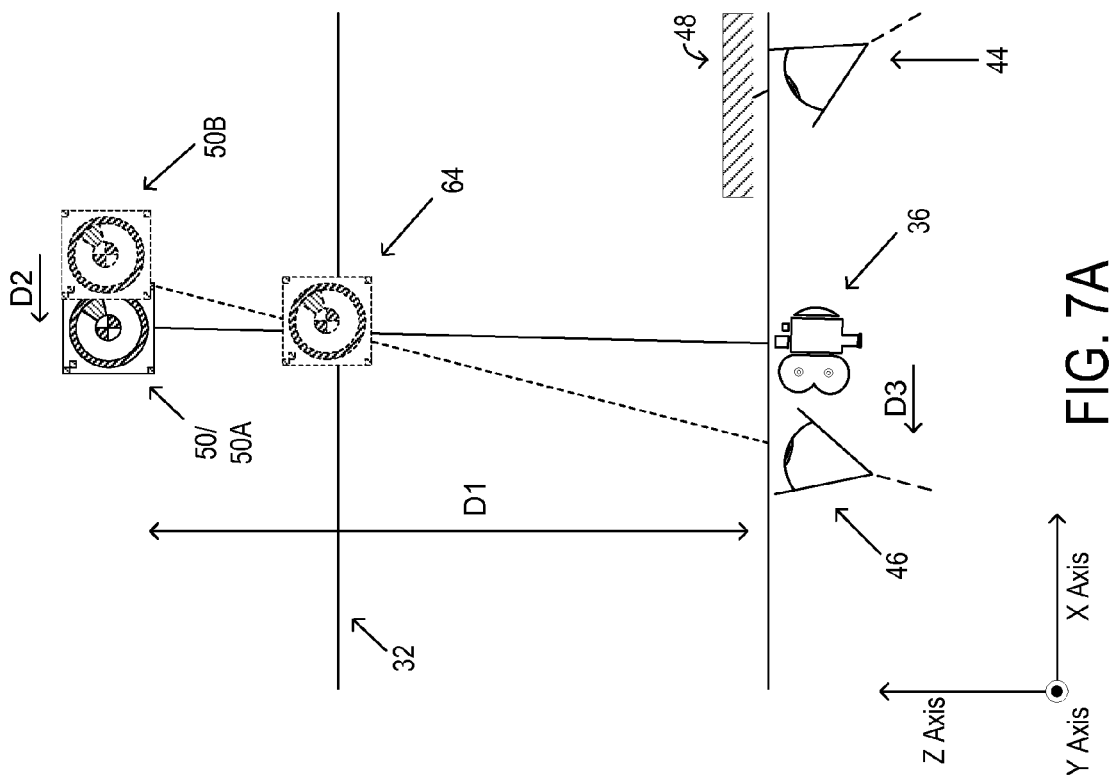
FIG. 7A shows an alignment hologram rendered with an incorrect inter-pupillary distance according to an embodiment of the present description.

Now turning to FIG. 7A, the physical object 50 is located a distance D1 away from the HMD device 10. In this example, a corresponding virtual world is generated that includes a virtual object 50A that is located in a location in the virtual world that corresponds to the location of the physical object 50 in the real world. That is, from the perspective of the HMD device 10, the physical object 50 and the virtual object 50A overlap with each other in the same location. When rendering the virtual object 50A, the HMD device 10 determines a view of the virtual object 50A which serves as the alignment hologram, from the perspective of the left virtual camera 36 that represents the default view matrix for the left eye of the user.

As illustrated in FIG. 7A, the determined view results in an image 64 that is rendered at the rendering focal plane 32 of the HMD device 10. When the user views the image 64 on the at least partially see-through display with the user's left eye 46, because there is an IPD error between the default IPD of the HMD device 10 and the user's actual IPD, the user will perceive that the virtual object 50A is at the location of perceived virtual object 50B. Accordingly, the user will perceive that the virtual object 50A, which serves as the alignment hologram, is not aligned with the physical object 50. In the example illustrated in FIG. 7A, the user perceives the perceived virtual object 50B that is slightly to the right of the physical object 50. In order to align the perceived virtual object 50B with the physical object 50, the user may enter an adjustment input to translate the perceived virtual object 50B a distance and direction D2 in the x axis.

After receiving the adjustment input from the user, the HMD device 10 may adjust the default view matrix represented by left virtual camera 36, by translating the default view matrix a distance and direction D3 in the x axis. It will be appreciated that the distance and direction D2 may not be the same as the distance and direction D3. The adjustment applied to the default view matrix, or left virtual camera 36 in FIG. 7A, will depend upon a variety of variables, such as the distance D1, the distance from the HMD device to the rendering focal plane, the adjustment applied to the alignment hologram, and other variables.

As illustrated in FIG. 7B, after adjusting the default view matrix or left camera 36 by the distance and direction D3, the adjusted left virtual camera 36 will more accurately correspond to the actual characteristics, such as PD, of the user's left eye. Accordingly, the view of the virtual object 50A from the perspective of the adjusted left virtual camera 36A, will result in the adjusted image 64A rendered at the rendering focal plane 32 of the HMD device 10. When viewing the adjusted image 64A on the at least partially see-through stereoscopic display 12, the user will perceive the perceived virtual object 50B. As illustrated in FIG. 7B, because the adjusted left virtual camera 36A, which visually represents the adjusted default view matrix, accurately models the actual characteristics of the user's left eye 46, the user will perceive that the perceived virtual object 50B is aligned with the physical object 50. Conversely, once the user has adjusted the perceived virtual object 50B, which is an alignment hologram, such that the perceived virtual object 50B is aligned with the physical object 50, then the adjusted left virtual camera 36A will accurately model the characteristics of the user's left eye. In other words, when the alignment hologram has been adjusted such that it appears to the user to be visually aligned with the physical feature, then the adjusted default view matrix that was used by the HMD device 10 to render the aligned alignment hologram will accurately correspond to actual characteristics, such as PD, of the user's eye. Accordingly, the adjusted default view matrix can then be used to adjust a view matrix setting of the HMD device, such that the HMD device is calibrated to the user's actual eye characteristics. Additionally, this process may be repeated for the user's right eye, such that calibrated view matrices are determined for both the user's left eye and the user's right eye. Accordingly, based on the calibrated view matrices for the left and right eye, the user's eye characteristics may be determined. For example, the user's IPD may be calculated based on the chord between the two view matrices for the user's left and right eye.

Now turning to FIG. 8A, the physical object 50 detected by the HMD device 10 should be at least a threshold distance away from the rendering focal plane 32 of the HMD device 10. The rendering focal plane 32 is a set characteristic of the HMD device 10, and may be 1-2 meters away from the HMD device 10. However, it will be appreciated that the rendering focal plane may be set to virtually any distance without departing from the scope of this application.

It will be further appreciated that if the physical object 50 was substantially coplanar with the rendering focal plane, then the alignment hologram would be rendered at or substantially near the rendering focal plane. Consequently, as the alignment holograms is rendered at the focal plane, the alignment hologram will appear world-locked even if the inter-pupillary distances used to render the alignment holograms were incorrect. Thus, different errors in the default view matrices will not result in a different perceived location of the alignment hologram, and the default view matrix will not be accurately calibrated.

Accordingly, as illustrated in FIG. 8A and FIG. 8B, the physical object 50, which includes the physical feature, should be located at least a threshold distance away from the rendering focal plane 32. In one specific example, if the rendering focal plane is 2 meters from the HMD device 10, then the threshold distance may be 1.7 meters, and distance D1 that is the distance between the physical object and the user may be 30 centimeters. It will be appreciated that a large variety of threshold distance are possible without departing from the scope of this application. As other examples, the threshold distance may be set to be between 10% and 40%, between 25% and 35% and most specifically substantially 30%, of the distance from the HMD device 10 to the rendering focal plane 32. In other examples, the threshold distance may be less than 20% or greater than 40% of the distance from the HMD device 10 to the rendering focal plane 32.

FIG. 8A illustrates an example where the physical object 50 is in front of the rendering focal plane 32. However, FIG. 8B illustrates a second example where the physical object 50 is farther away from the user than the rendering focal plane 32. In either example, physical object 50 should be at least a threshold distance away from the rendering focal plane 32, such that the perceived misalignment detailed in FIG. 7A will occur due to errors in the default view matrix compared to the actual characteristics, such as IPD, of the user's eyes. If the physical object 50 is not located at least a threshold distance away from the rendering focal plane, the HMD device 10 may output an instruction to the user to move either closer or farther away from the physical object 50. This instruction may be a visual rendered on the at least partially see-through stereoscopic display 12, an auditory output, or virtually any other medium well known in the art for communicating to the user In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
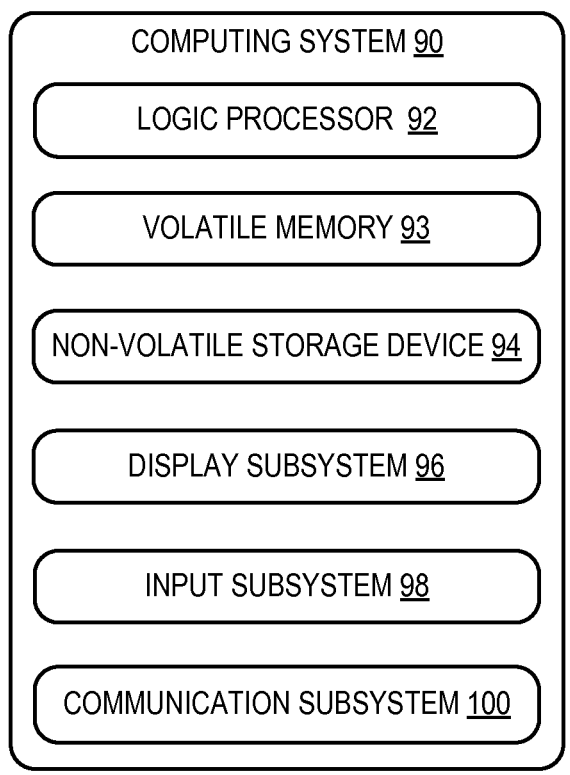
FIG. 9 shows a computing system according to an embodiment of the present description.

FIG. 9 schematically shows a non-limiting embodiment of a computing system 90 that can enact one or more of the methods and processes described above. Computing system 90 is shown in simplified form. Computing system 90 may take the form of one or more head-mounted display devices as shown in FIG. 1, or one or more devices cooperating with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 90 includes a logic processor 92 volatile memory 93, and a non-volatile storage device 94. Computing system 90 may optionally include a display subsystem 96, input subsystem 98, communication subsystem 100, and/or other components not shown in FIG. 9.

Logic processor 92 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 92 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 94 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 94 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 94 may include nonvolatile, dynamic, static, read/write, read-only, sequential-access, location-addressable, file-addressable, and/or content-addressable devices. It will be appreciated that non-volatile storage device 94 is configured to hold instructions even when power is cut to the non-volatile storage device 94.

Volatile memory 93 may include physical devices that include random access memory. Volatile memory 93 is typically utilized by logic processor 92 to temporarily store information during processing of software instructions. It will be appreciated that volatile memory 93 typically does not continue to store instructions when power is cut to the volatile memory 93.

Aspects of logic processor 92, volatile memory 93, and non-volatile storage device 94 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 90 implemented to perform a particular function. In some cases, a module, program, or engine may be instantiated via logic processor 92 executing instructions held by non-volatile storage device 94, using portions of volatile memory 93. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 96 may be used to present a visual representation of data held by non-volatile storage device 94. This visual representation may take the form of a graphical user interface (GUI). As the herein described methods and processes change the data held by the non-volatile storage device, and thus transform the state of the non-volatile storage device, the state of display subsystem 96 may likewise be transformed to visually represent changes in the underlying data. Display subsystem 96 may include one or more display devices utilizing virtually any type of technology. Such display devices may be combined with logic processor 92, volatile memory 93, and/or non-volatile storage device 94 in a shared enclosure, or such display devices may be peripheral display devices. The at least partially see-through display of HMD 10 described above is one example of a display subsystem 96.

When included, input subsystem 98 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; any of the sensors described above with respect to position sensor system 18 of FIG. 1; and/or any other suitable sensor.

When included, communication subsystem 100 may be configured to communicatively couple computing system 90 with one or more other computing devices. Communication subsystem 100 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 90 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The following paragraphs provide additional support for the claims of the subject application. One aspect provides a head-mounted display device for alignment based view matrix tuning comprising, an at least partially see-through display, a processor, and a non-volatile storage device holding instructions executable by the processor to: detect a physical feature having a physical location that is at least a threshold distance away from a rendering focal plane of the head-mounted display device, generate an alignment hologram based on the physical feature, determine a view of the alignment hologram based on a default view matrix for a first eye of a user of the head-mounted display device, display the view of the alignment hologram to the first eye of the user on the at least partially see-through display, output an instruction to the user to enter an adjustment input to visually align the alignment hologram with the physical feature, determine a calibrated view matrix based on the default view matrix and the adjustment input, and adjust a view matrix setting of the head-mounted display device based on the calibrated view matrix. The head-mounted display device may additionally or optionally include, increase an opacity of a region of the at least partially see-through display corresponding to a second eye of the user, such that the physical feature and the alignment hologram are not viewed by the second eye of the user. The head-mounted display device may additionally or optionally include, wherein the physical feature is indicia on a 2D surface of a physical object and the alignment hologram corresponds in shape to the indicia and is programmatically generated for display or pre-stored on the non-volatile storage device and retrieved for display. The head-mounted display device may additionally or optionally include, wherein the physical feature is an optical tag that is located in a central region of the 2D surface. The head-mounted display device may additionally or optionally include, wherein the physical feature is one of a plurality of physical features, and a second physical feature of the plurality of physical features is a second optical tag that is located in a peripheral region of the 2D surface. The head-mounted display device may additionally or optionally include, wherein the physical feature is a physical object viewed by the head-mounted display device, and the alignment hologram is generated in real time based on a captured image received at an outward facing camera of the head-mounted display device. The head-mounted display device may additionally or optionally include, wherein the threshold distance is between 20-40% of the distance from the head-mounted display device to the rendering focal plane. The head-mounted display device may additionally or optionally include, wherein the adjustment input includes inputs to translate the alignment hologram along one or more of an x, y, or z axis. The head-mounted display device may additionally or optionally include, wherein the adjustment input further includes input to rotate the alignment hologram in one or more of a pitch, yaw, or roll rotation. The head-mounted display device may additionally or optionally include instructions to: determine a second view of the alignment hologram based on a second default view matrix for a second eye of the user of the head-mounted display device, display the second view of the alignment hologram to the second eye of the user on the at least partially see-through display, output a second instruction to the user to enter a second adjustment input to visually align the alignment hologram with the physical feature, determine a second calibrated view matrix based on the second default view matrix and the second adjustment input, and adjust the view matrix setting of the head-mounted display device based on the second calibrated view matrix.

Another aspect provides a method for alignment based view matrix tuning of a head-mounted display device comprising: detecting a physical feature having a physical location that is at least a threshold distance away from a rendering focal plane of the head-mounted display device, generating an alignment hologram based on the physical feature, determining a view of the alignment hologram based on a default view matrix for a first eye of a user of the head-mounted display device, displaying the view of the alignment hologram to the first eye of the user on an at least partially see-through display of the head-mounted display device, outputting an instruction to the user to enter an adjustment input to visually align the alignment hologram with the physical feature, determining a calibrated view matrix based on the default view matrix and the adjustment input, and adjusting a view matrix setting of the head-mounted display device based on the calibrated view matrix. The method may additionally or optionally include, increasing an opacity of a region of the at least partially see-through display corresponding to a second eye of the user, such that the physical feature and the alignment hologram are not viewed by the second eye of the user. The method may additionally or optionally include, wherein the physical feature is indicia on a 2D surface of a physical object and the alignment hologram corresponds in shape to the indicia and is programmatically generated for display or pre-stored on the non-volatile storage device and retrieved for display. The method may additionally or optionally include, wherein the physical feature is one of a plurality of physical features that are optical tags located in a central region and a peripheral region of the 2D surface. The method may additionally or optionally include, wherein the physical feature is a physical object viewed by the head-mounted display device, and the alignment hologram is generated real time based on a captured image received at an outward facing camera of the head-mounted display device. The method may additionally or optionally include, wherein the threshold distance is between 20-40% of the distance from the head-mounted display device to the rendering focal plane. The method may additionally or optionally include, wherein the adjustment input includes inputs to translate the alignment hologram along one or more of an x, y, or z axis. The method may additionally or optionally include, wherein the adjustment input further includes input to rotate the alignment hologram in one or more of a pitch, yaw, or roll rotation. The method may additionally or optionally include, determining a second view of the alignment hologram based on a second default view matrix for a second eye of the user of the head-mounted display device, displaying the second view of the alignment hologram to the second eye of the user on the at least partially see-through display, outputting a second instruction to the user to enter a second adjustment input to visually align the alignment hologram with the physical feature, determining a second calibrated view matrix based on the second default view matrix and the second adjustment input, and adjusting the view matrix setting of the head-mounted display device based on the second calibrated view matrix.

Another aspect provides a head-mounted display device for alignment based view matrix tuning comprising, a display, a processor, and a non-volatile storage device holding instructions executable by the processor to: detect a physical feature having a physical location that is at least a threshold distance away from a rendering focal plane of the head-mounted display device, generate an alignment hologram based on the physical feature, determine a view of the alignment hologram based on a default view matrix for a first eye of a user of the head-mounted display device, display the view of the alignment hologram to the first eye of the user on the display, receive an adjustment input from the user to visually align the alignment hologram with the physical feature, determine a calibrated view matrix based on the default view matrix and the adjustment input, and adjust a view matrix setting of the head-mounted display device based on the calibrated view matrix.

The invention claimed is:

1. A head-mounted display device for alignment based view matrix tuning comprising:
    an at least partially see-through display;
    a processor;
    a non-volatile storage device holding instructions executable by the processor to:
        detect a physical feature having a physical location that is at least a threshold distance away from a rendering focal plane of the head-mounted display device, wherein the physical feature is indicia on a 2D surface of a physical object;
        generate an alignment hologram based on the physical feature, wherein the alignment hologram corresponds in shape to the indicia and is programmatically generated for display or pre-stored on the non-volatile storage device and retrieved for display;
        determine a view of the alignment hologram based on a default view matrix for a first eye of a user of the head-mounted display device;
        display the view of the alignment hologram to the first eye of the user on the at least partially see-through display;
        output an instruction to the user to enter an adjustment input to visually align the alignment hologram with the physical feature;
        determine a calibrated view matrix based on the default view matrix and the adjustment input; and
        adjust a view matrix setting of the head-mounted display device based on the calibrated view matrix.

2. The head-mounted display device of claim 1, further comprising instructions to:
    increase an opacity of a region of the at least partially see-through display corresponding to a second eye of the user, such that the physical feature and the alignment hologram are not viewed by the second eye of the user.

3. The head-mounted display device of claim 1, wherein the physical feature is an optical tag that is located in a central region of the 2D surface.

4. The head-mounted display device of claim 3, wherein the physical feature is one of a plurality of physical features, and a second physical feature of the plurality of physical features is a second optical tag that is located in a peripheral region of the 2D surface.

5. The head-mounted display device of claim 1, wherein the physical feature is a physical object viewed by the head-mounted display device, and the alignment hologram is generated in real time based on a captured image received at an outward facing camera of the head-mounted display device.

6. The head-mounted display device of claim 1, wherein the threshold distance is between 20-40% of the distance from the head-mounted display device to the rendering focal plane.

7. The head-mounted display device of claim 1, wherein the adjustment input includes inputs to translate the alignment hologram along one or more of an x, y, or z axis.

8. The head-mounted display device of claim 7, wherein the adjustment input further includes input to rotate the alignment hologram in one or more of a pitch, yaw, or roll rotation.

9. The head-mounted display device of claim 1, further comprising instructions to:
    determine a second view of the alignment hologram based on a second default view matrix for a second eye of the user of the head-mounted display device;
    display the second view of the alignment hologram to the second eye of the user on the at least partially see-through display;
    output a second instruction to the user to enter a second adjustment input to visually align the alignment hologram with the physical feature;
    determine a second calibrated view matrix based on the second default view matrix and the second adjustment input; and
    adjust the view matrix setting of the head-mounted display device based on the second calibrated view matrix.

10. A method for alignment based view matrix tuning of a head-mounted display device comprising:
    detecting a physical feature having a physical location that is at least a threshold distance away from a rendering focal plane of the head-mounted display device, wherein the physical feature is indicia on a 2D surface of a physical object;

generating an alignment hologram based on the physical feature, wherein the alignment hologram corresponds in shape to the indicia and is programmatically generated for display or pre-stored and retrieved for display;

determining a view of the alignment hologram based on a default view matrix for a first eye of a user of the head-mounted display device;

displaying the view of the alignment hologram to the first eye of the user on an at least partially see-through display of the head-mounted display device;

outputting an instruction to the user to enter an adjustment input to visually align the alignment hologram with the physical feature;

determining a calibrated view matrix based on the default view matrix and the adjustment input; and adjusting a view matrix setting of the head-mounted display device based on the calibrated view matrix.

11. The method of claim 10, further comprising:

increasing an opacity of a region of the at least partially see-through display corresponding to a second eye of the user, such that the physical feature and the alignment hologram are not viewed by the second eye of the user.

12. The method of claim 10, wherein the physical feature is one of a plurality of physical features that are optical tags located in a central region and a peripheral region of the 2D surface.

13. The method of claim 10, wherein the physical feature is a physical object viewed by the head-mounted display device, and the alignment hologram is generated real time based on a captured image received at an outward facing camera of the head-mounted display device.

14. The method of claim 10, wherein the threshold distance is between 20-40% of the distance from the head-mounted display device to the rendering focal plane.

15. The method of claim 10, wherein the adjustment input includes inputs to translate the alignment hologram along one or more of an x, y, or z axis.

16. The method of claim 15, wherein the adjustment input further includes input to rotate the alignment hologram in one or more of a pitch, yaw, or roll rotation.

17. The method of claim 10, further comprising:

determining a second view of the alignment hologram based on a second default view matrix for a second eye of the user of the head-mounted display device;

displaying the second view of the alignment hologram to the second eye of the user on the at least partially see-through display;

outputting a second instruction to the user to enter a second adjustment input to visually align the alignment hologram with the physical feature;

determining a second calibrated view matrix based on the second default view matrix and the second adjustment input; and adjusting the view matrix setting of the head-mounted display device based on the second calibrated view matrix.

18. A head-mounted display device for alignment based view matrix tuning comprising:

a display;

a processor;

a non-volatile storage device holding instructions executable by the processor to:

detect a physical feature having a physical location that is at least a threshold distance away from a rendering focal plane of the head-mounted display device, wherein the physical feature is indicia on a 2D surface of a physical object;

generate an alignment hologram based on the physical feature, wherein the alignment hologram corresponds in shape to the indicia and is programmatically generated for display or pre-stored on the non-volatile storage device and retrieved for display;

determine a view of the alignment hologram based on a default view matrix for a first eye of a user of the head-mounted display device;

display the view of the alignment hologram to the first eye of the user on the display;

receive an adjustment input from the user to visually align the alignment hologram with the physical feature;

determine a calibrated view matrix based on the default view matrix and the adjustment input; and adjust a view matrix setting of the head-mounted display device based on the calibrated view matrix.

* * * * *